US012741443B2

(12) United States Patent
Nakhmanovich

(10) Patent No.: US 12,741,443 B2
(45) Date of Patent: Sep. 22, 2026

(54) ARTICLE HAVING A PATTERNED METAL FILM ON A SURFACE THEREOF, AND METHODS OF PRODUCTION THEREFOR

(71) Applicant: SCODIX LTD., Rosh Ha'ayin (IL)

(72) Inventor: Gregory Nakhmanovich, Oranit (IL)

(73) Assignee: SCODIX LTD., Rosh Ha'ayin (IL)

( * ) Notice: Subject to any disclaimer, the term of this patent is extended or adjusted under 35 U.S.C. 154(b) by 0 days.

(21) Appl. No.: 18/707,610

(22) PCT Filed: Nov. 17, 2022

(86) PCT No.: PCT/IB2022/061099

§ 371 (c)(1),
(2) Date: May 6, 2024

(87) PCT Pub. No.: WO2023/089530

PCT Pub. Date: May 25, 2023

(65) Prior Publication Data

US 2024/0286430 A1 Aug. 29, 2024

(30) Foreign Application Priority Data

Nov. 17, 2021 (GB) ..................................... 2116562

(51) Int. Cl.
*B32B 5/02* (2006.01)
*B32B 15/12* (2006.01)
*B32B 15/14* (2006.01)

(52) U.S. Cl.
CPC ................ *B32B 5/02* (2013.01); *B32B 15/12* (2013.01); *B32B 15/14* (2013.01);
(Continued)

(58) Field of Classification Search
CPC .......... B32B 5/02; B32B 15/12; B32B 15/14; B32B 2255/06; B32B 2255/26;
(Continued)

(56) References Cited

U.S. PATENT DOCUMENTS 3,589,962 A 6/1971 Bonjour
5,736,253 A 4/1998 Hinchcliffe
(Continued)

FOREIGN PATENT DOCUMENTS

CN 103971788 A 8/2014
JP H07216765 A 8/1995
(Continued)

OTHER PUBLICATIONS

Millipore Sigma (Year: 2025).*
(Continued)

*Primary Examiner* — Betelhem Shewareged
(74) *Attorney, Agent, or Firm* — Momentum IP Ltd.; Marc Van Dyke

(57) ABSTRACT

An article having a patterned metallic film on a surface thereof, and methods of producing such an article, the article including: (a) a porous substrate having a first porous surface; (b) a patterned metallic film attached to the first porous surface, including (i) a first patterned polymeric layer attached to the first porous surface; and (ii) a patterned metallic layer attached to the first patterned polymeric layer, on a distal side with respect to the first porous surface; wherein a thickness of the metal layer is at most 3 μm.

18 Claims, 4 Drawing Sheets

(52) U.S. Cl.
CPC ....... *B32B 2255/06* (2013.01); *B32B 2255/26* (2013.01); *B32B 2262/0276* (2013.01); *B32B 2262/062* (2013.01); *B32B 2451/00* (2013.01)

(58) Field of Classification Search
CPC ...... B32B 2262/0276; B32B 2262/062; B32B 2451/00
USPC .......................................................... 428/209
See application file for complete search history.

(56) References Cited

U.S. PATENT DOCUMENTS 11,346,000 B2* 5/2022 Nakhmanovich ... C08F 222/102
2002/0052501 A1* 5/2002 Taniguchi .............. C09K 11/06 546/66
2002/0168514 A1* 11/2002 Wright ....................... C09J 7/20 156/332
2003/0124347 A1* 7/2003 Sasongko .............. A43B 13/12 428/343
2004/0234585 A1* 11/2004 Gale ...................... A61K 9/703 514/343
2005/0196595 A1 9/2005 Morris
2010/0212821 A1* 8/2010 Grinberg ............... B44B 5/0071 156/277
2010/0255265 A1 10/2010 Funicelli
2013/0280579 A1* 10/2013 Wright ................. H01G 9/0029 429/188
2018/0072045 A1 3/2018 Kosalla
2021/0197612 A1 7/2021 Hoffmann
2022/0089913 A1* 3/2022 Wu ........................ C08G 18/40
2024/0286430 A1* 8/2024 Nakhmanovich ......... B44C 1/14

FOREIGN PATENT DOCUMENTS

JP 2012210715 A 11/2012
WO 2005/091949 A2 10/2005

OTHER PUBLICATIONS

International search report for PCT/IB2022/061099 mail-date Mar. 26, 2023.
Written Opinion for PCT/IB2022/061099 mail-date Mar. 26, 2023.

* cited by examiner

FIG. 2

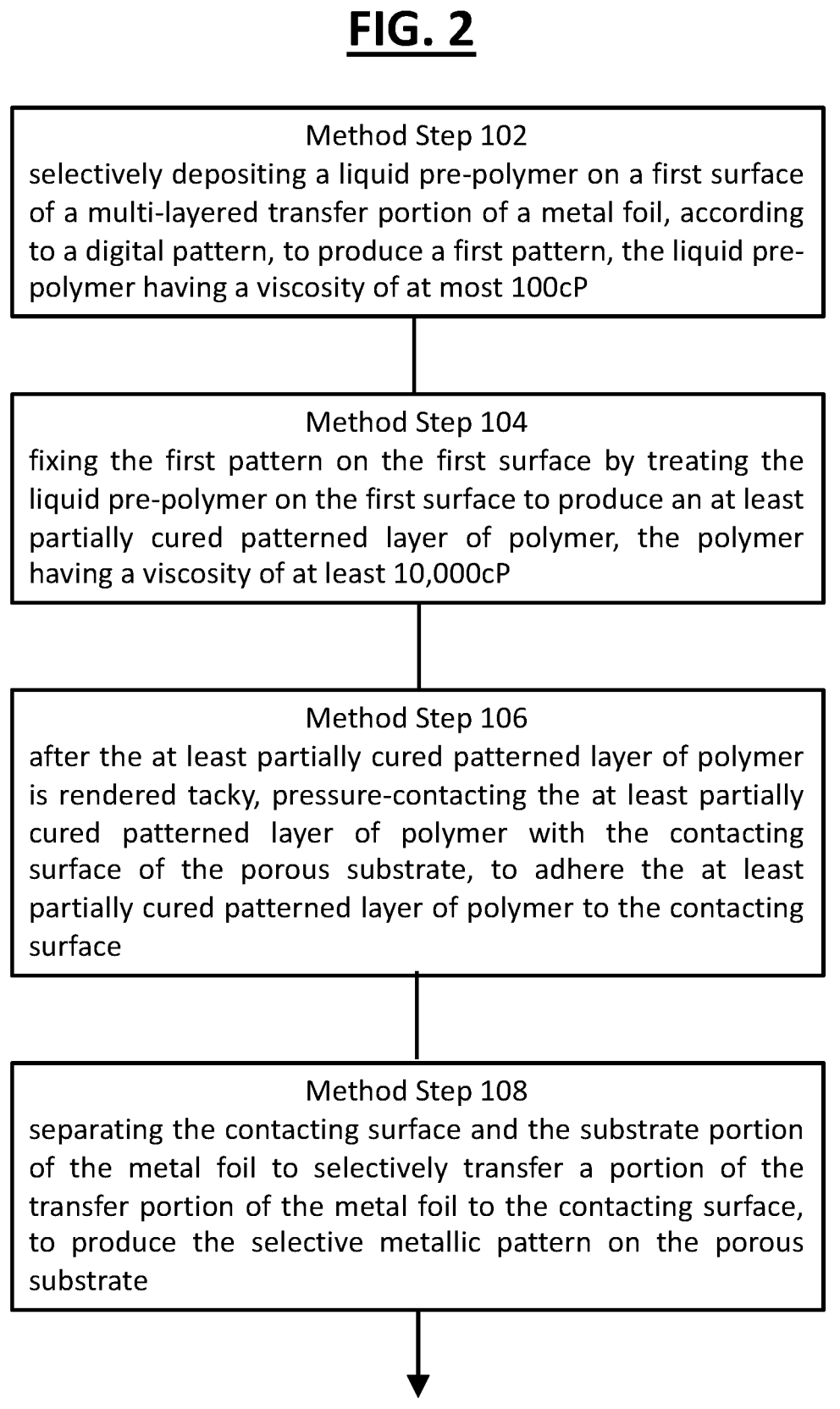

Method Step 102
selectively depositing a liquid pre-polymer on a first surface of a multi-layered transfer portion of a metal foil, according to a digital pattern, to produce a first pattern, the liquid pre-polymer having a viscosity of at most 100cP Method Step 104
fixing the first pattern on the first surface by treating the liquid pre-polymer on the first surface to produce an at least partially cured patterned layer of polymer, the polymer having a viscosity of at least 10,000cP Method Step 106
after the at least partially cured patterned layer of polymer is rendered tacky, pressure-contacting the at least partially cured patterned layer of polymer with the contacting surface of the porous substrate, to adhere the at least partially cured patterned layer of polymer to the contacting surface Method Step 108
separating the contacting surface and the substrate portion of the metal foil to selectively transfer a portion of the transfer portion of the metal foil to the contacting surface, to produce the selective metallic pattern on the porous substrate

ARTICLE HAVING A PATTERNED METAL FILM ON A SURFACE THEREOF, AND METHODS OF PRODUCTION THEREFOR

This application draws priority from GB Patent Application No. 2116562.6, filed Nov. 17, 2021, which application is incorporated by reference for all purposes as if fully set forth herein.

FIELD AND BACKGROUND OF THE INVENTION

The present invention relates to articles having a patterned metal foil on a surface thereof, and digital methods of production therefor.

SUMMARY OF THE INVENTION

According to teachings of the present invention there is provided a method of producing a selective metallic pattern on a contacting surface of a substrate, the method including: (a) selectively depositing a liquid pre-polymer on a first surface of a multi-layered transfer portion of a metal foil, according to a digital pattern, to produce a first pattern, the liquid pre-polymer having a viscosity of at most 100 cP; the metal foil including: (i) a substrate portion having a release layer disposed on top of a carrier layer; and (ii) the multi-layered transfer portion, wherein the multi-layered transfer portion includes a first polymeric layer distally disposed with respect to the substrate portion, a metallic layer disposed between the first polymeric layer and the substrate portion, proximal to the release layer, and optionally, a second polymeric layer, disposed in between the release layer and the metallic layer; the metal foil having a thickness of at most 40 micrometers; (b) fixing the first pattern on the first surface by treating the liquid pre-polymer on the first surface to produce an at least partially cured patterned layer of polymer, the polymer having a viscosity of at least 10,000 cP; (c) after the at least partially cured patterned layer of polymer is rendered tacky, pressure-contacting the at least partially cured patterned layer of polymer with the contacting surface of the substrate, to adhere the at least partially cured patterned layer of polymer to the contacting surface; and (d) separating the contacting surface and the substrate portion of the metal foil to selectively transfer a portion of the transfer portion of the metal foil to the contacting surface, to produce the selective metallic pattern on the substrate.

According to embodiments of the present invention, the selective depositing of the liquid pre-polymer is performed by ink-jetting.

According to other aspects of the present invention there is provided an article having a patterned metallic film on a surface thereof, the article including: (a) a porous substrate having a first porous surface; (b) a patterned metallic film attached to the first porous surface, including (i) a first patterned polymeric layer attached to the first porous surface; and (ii) a patterned metallic layer attached to the first patterned polymeric layer, on a distal side with respect to the first porous surface; wherein a thickness of the metal layer is at most 3 μm.

According to other aspects of the present invention there is provided a method of producing an article having a patterned metallic film on a surface thereof, the method being substantially as provided herein.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 2 is a block diagram providing aspects of a production method of the present invention;

DESCRIPTION OF THE PREFERRED EMBODIMENTS

Figure 1:
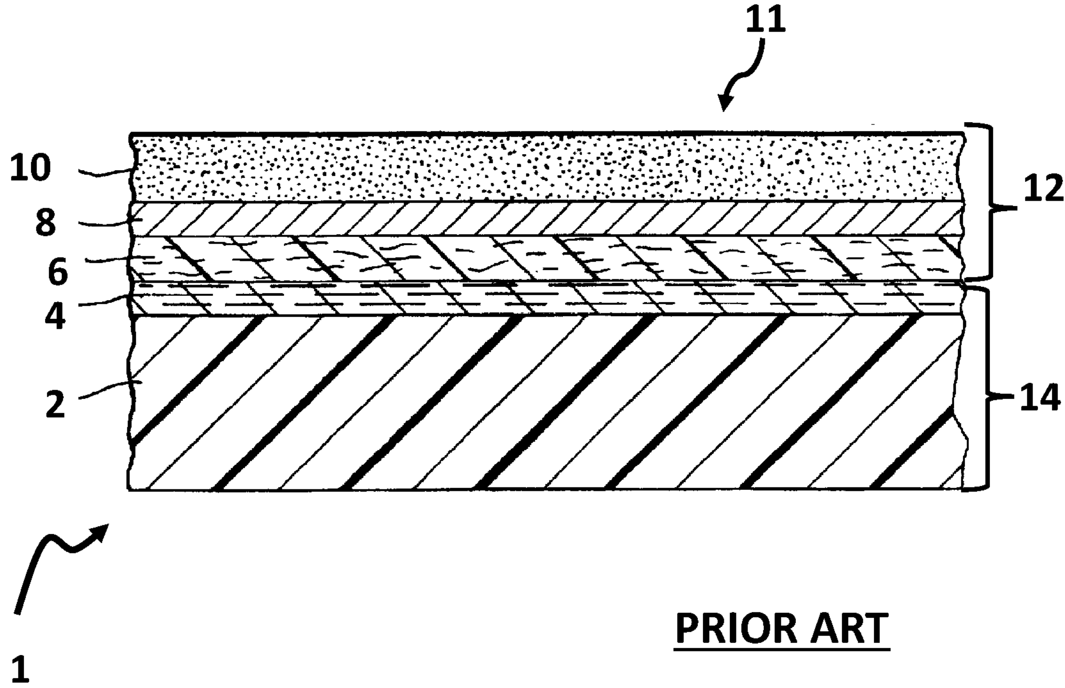
FIG. 1 is a schematic illustration showing the structure of a conventional metal foil for use in accordance with the present invention.

The present invention relates to articles such as fabric (or more generally, "target") substrates having a patterned metal foil on a surface thereof, and methods of production thereof.

The principles of the inventive articles having a patterned metal foil on a surface thereof, as well as the methods of production thereof, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a schematic illustration showing the structure of a conventional metal foil 1 that may be used in accordance with the present invention. The illustration is adapted from U.S. Pat. No. 8,674,229, which is incorporated by reference for all purposes as if fully set forth herein.

Metal foil 1 includes a first or substrate portion 14 including a release layer 4 disposed on top of a carrier or liner layer 2. On top of first, substrate portion 14 is a multi-layered (metallic) transfer film or portion 12. Multi-layered transfer film or portion 12 includes a polymeric layer 6, disposed proximally to release layer 4. A metallic layer 8 is disposed on top of polymeric layer 6, distal to release layer 4. A polymeric or adhesive layer 10 is disposed on top of metallic layer 8. The top surface of multi-layered transfer film or portion 12 is designated as first or top surface 11.

In some embodiments of the present invention, multi-layered transfer film or portion 12 may be devoid of polymeric or adhesive layer 10.

Multi-layered transfer film or portion 12 may be transferred to the surface of the substrate, leaving behind substrate portion 14.

Various processes may be used to transfer multi-layered (metallic) transfer film or portion 12 to a substrate, typically using pressure (and in some processes—heat) to facilitate the transfer.

In some processes, a continuous layer of adhesive is subjected to a masking procedure, in which the masking is performed according to a pre-determined pattern or image, whereby, upon separation or removal of the mask from the target substrate, the metal layer remains attached to the target substrate according to that pre-determined pattern or image.

The adhesive layer may be quite thin, typically on the order of several microns. The thinness of the adhesive layer may contribute to the ability of the finished product to flex and to mitigate cracking.

The thinness of the coating and adhesive layers can also contribute to the crispness of the metallic image. Such thinness may appreciably reduce the curing time and/or improve the homogeneity of the cured material. Some of such processes may be inappropriate, ineffective, or otherwise deficient in transferring the multi-layered (metallic) transfer film to a porous substrate such as a fabric or an uncoated paper product.

Alternatively, the adhesive may be selectively applied directly to the target substrate, according to a pre-determined pattern. Upon separation of the metal foil from the target substrate, a portion of the metal layer remains attached to the target substrate according to that pre-determined pattern. In this case, the viscosity of the adhesive applied to the target substrate should be high, such that the adhesive does not flow away from the pre-determined placement locations after it has been applied on the substrate surface. This may be particularly important for fabrics and other substrates having a high surface roughness including peaks and valleys. In addition, the viscosity should be sufficiently high to inhibit or at least largely mitigate the deleterious penetration of the adhesive into pores or open spaces of the target substrate.

The methods of the present invention, while effective in transferring the multi-layered (metallic) transfer film to non-porous substrates, are also effective in transferring the multi-layered (metallic) transfer film to porous substrates.

Multi-layered transfer film or portion 12 is typically transferred to the surface of the substrate, leaving behind substrate portion 14.

In some embodiments, multi-layered transfer film or portion 12 may be devoid of polymeric or adhesive layer 10.

FIG. 2 is a block diagram providing aspects of a production method of the present invention. In Method Step 102, a liquid pre-polymer is selectively deposited on a first surface of a metal foil, according to a digital pattern, to produce a first pattern, the liquid pre-polymer having a viscosity of at most 100 cP measured at room temperature, or a viscosity of at most 60 cP measured at the operating temperature.

In some embodiments, the selective deposition is performed by ink-jetting.

Method Step 104 includes fixing the first pattern on the first surface by treating the liquid pre-polymer on the first surface to produce an at least partially cured patterned layer of polymer. The viscosity increase of the polymer is sufficient to fix the first pattern on the first surface. Typically, the polymer attains a viscosity of at least 10,000 cP in this method step, as measured at the operating temperature.

Typically, the polymer becomes tacky as a result of Method Step 104.

In some embodiments, the treating of the liquid pre-polymer may advantageously include curing or at least partial curing.

In some embodiments, the curing or at least partial curing may advantageously include UV curing.

Method Step 106 includes, after (or while) the at least partially cured patterned layer of polymer is rendered tacky, pressure-contacting the at least partially cured patterned layer of polymer with the contacting surface of the porous substrate, to adhere the at least partially cured patterned layer of polymer to the contacting surface.

Optionally, heating may be performed prior to this separation, so as to heat the substrate surface and the at least partially cured patterned layer of polymer.

In Method Step 108, the contacting surface and the substrate portion of the metal foil are then separated to selectively transfer a portion of the transfer portion of the metal foil to the contacting surface, to produce the selective metallic pattern on the (optionally and typically) porous substrate.

Optionally, active or passive cooling may be performed prior to this separation, so as to cool the substrate surface.

Figures 3A, 3B, 3C:
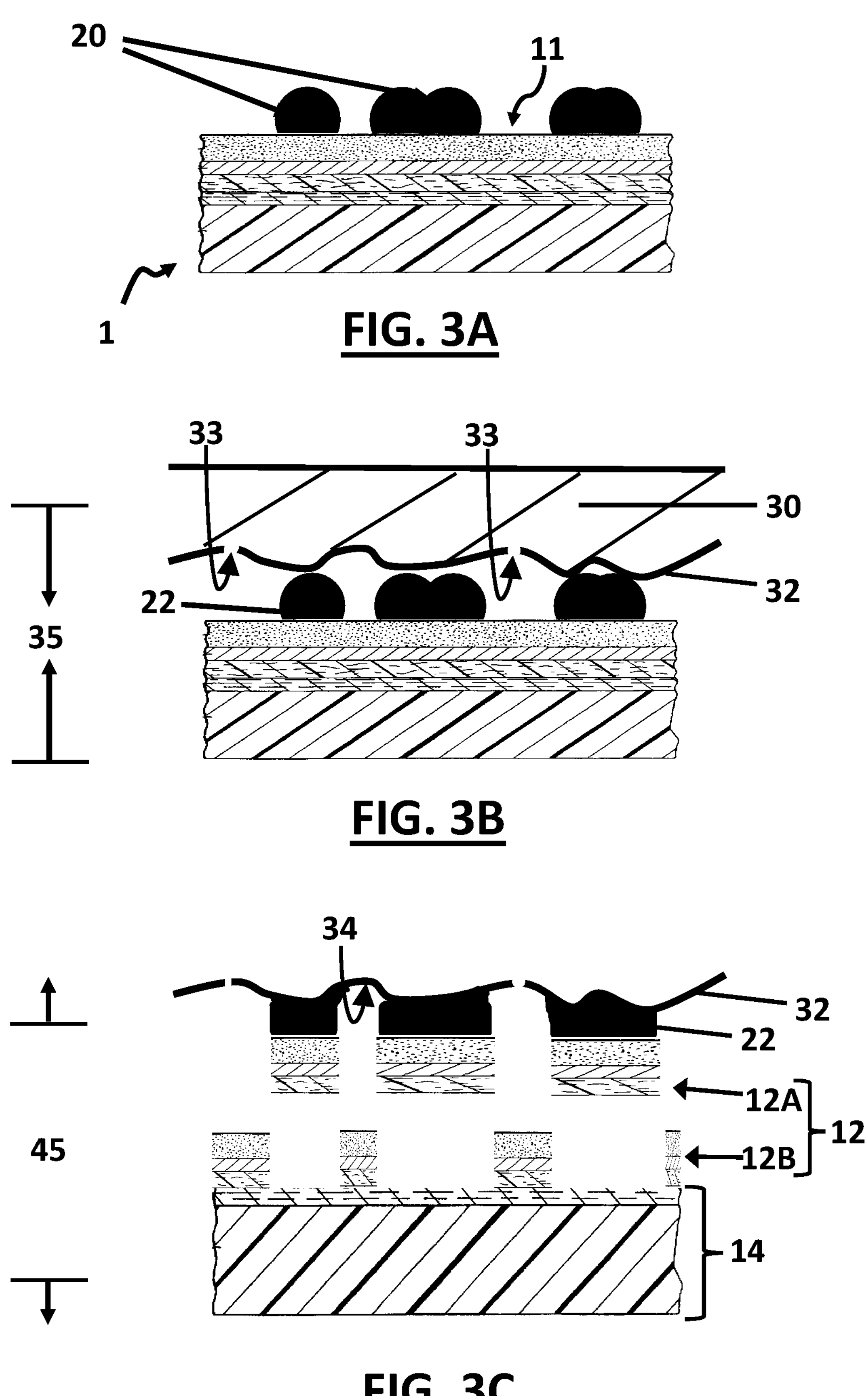
FIGS. 3A to 3C provide schematic illustrations of stages of aspects of the inventive method.

FIGS. 3A to 3C provide schematic illustrations of stages of aspects of the inventive method.

With reference now to FIG. 3A, FIG. 3A schematically illustrates a metal foil 1, on a first or top surface of which is selectively deposited a liquid pre-polymer 20, according to a digital pattern, to produce a first pattern. This is typically effected by ink-jetting.

FIG. 3B schematically illustrates the juxtaposition of a bottom or contacting surface 32 of substrate or porous substrate 30 with the top surface of the metal foil, after the liquid pre-polymer pattern thereon has been treated so as to fix the pattern on the top surface and so as to render tacky the at least partially cured patterned layer of polymer 22. FIG. 3B schematically shows a portion of the at least partially cured patterned layer of polymer 22 making initial contact with contacting surface 32 of substrate 30, as pressure-contacting 35 gets underway.

In some embodiments, contacting surface 32 of substrate 30 is porous or highly porous, as schematically represented by pores 33.

FIG. 3C schematically illustrates the separation 45 of the contacting surface 32 of the substrate 30 from the substrate portion 14 of the metal foil. This separation results in a selective transfer of a portion 12A of transfer portion 12 of the metal foil to the contacting surface 32, substantially where the at least partially cured patterned layer of polymer 22 is disposed. In areas 34 devoid of this polymer layer, transfer portion 12 of the metal foil is not transferred, and remains attached—as a remainder portion 12A of transfer portion 12—to substrate portion 14 of the metal foil.

Figure 4:
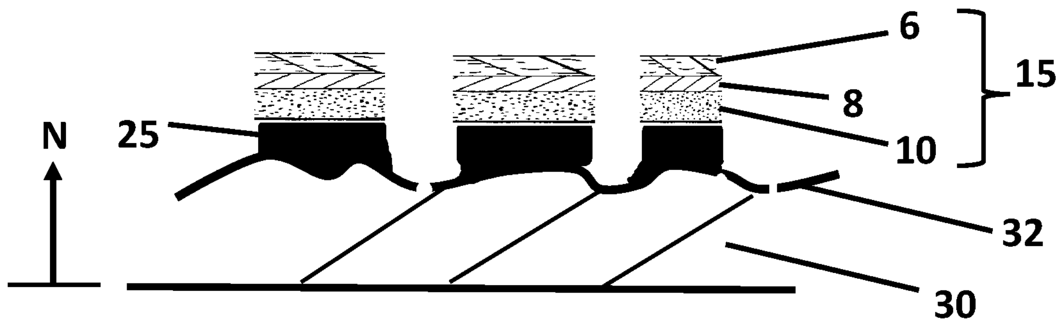
FIG. 4 is a schematic illustration of an inventive arrangement including an article or substrate having a patterned metal film on a surface thereof.

FIG. 4 is a schematic illustration of an inventive arrangement including an article or substrate having a patterned metallic film on a surface thereof. Such an article may include: (a) a porous substrate 30 having a first porous surface 32; (b) a patterned metallic film 15 attached to the first porous surface, the patterned metallic film including (i) a first patterned polymeric layer 25, 10 attached to the first porous surface; and (ii) a patterned metallic layer 8 attached to the first patterned polymeric layer, on a distal side with respect to the first porous surface; wherein a thickness of the patterned metal layer is at most 3 μm. Typically, the article has at least one of the following structural features: (A) the first patterned polymeric layer includes at least one photoinitiator such as alfa-hydroxy ketone, alfa-amino ketone, and phosphine oxide, and/or any of the photodecomposition products thereof, for example 2,4,6-trimethylbenzaldehyde, benzaldehyde, 1-phenyl-2-butanone, 2-hydroxy-2-methyl-1-phenylpropanone, 2-methyl-1-[4-(methylthio) phenyl]-2-morpholinopropan-1-one, diphenylphosphine oxide, phenylphosphine, ethyl phenylphosphinate; (B) a polymer of the first patterned polymeric layer which can contain unreacted monomers, for example an acrylate such as lauryl acrylate, isodecyl acrylate, tridecyl acrylate, isobornyl acrylate, 2-(2-ethoxyethoxy) ethyl acrylate, and 4-tert-butylcyclohexyl acrylate extends within the first porous surface by at most 5 μm, at most 3 μm, at most 2 μm, at most 1.5 μm, at most 1 μm, at most 0.8 μm, or at most 0.5 μm; and (C) the polymer of the first patterned polymeric layer extends within the first porous surface by 0.3 to 5 μm, 0.5 to 5 μm, 1 to 5 μm, 1.5 to 5 μm, 2 to 5 μm, 0.3 to 3 μm, 0.5 to 3 μm, 1 to 4 μm, or 1 to 3 μm.

Figure 5:
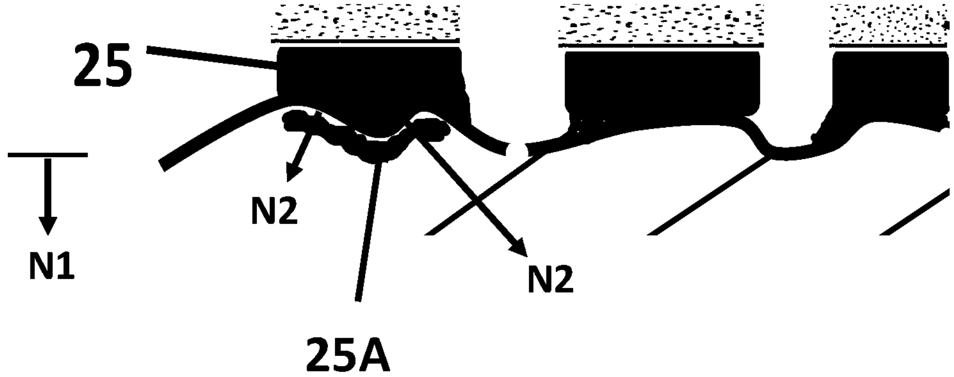
FIG. 5 is a partial, magnified view of FIG. 4, further showing polymeric ink that has penetrated below the surface of the porous substrate.

FIG. 5 is a partial, magnified view of FIG. 4, further showing polymeric ink 25A that has penetrated below the surface of the porous substrate due to the applied pressure. In determining the thickness of this penetrated polymer, either the direction normal to the substrate (N1) or the direction normal to the local contour of the substrate (N2) may be used.

With reference now to the relevant above-described figures, the carrier or liner layer 2 may be made of any suitable material, and is typically made of polyester or the like.

In some embodiments, the thickness of carrier or liner layer 2 may be within a range of 5 to 30 micrometers (μm) or 7 to 25 μm, and more typically, within a range of 7 to 20 μm, or 10 to 20 μm.

In some embodiments, release layer 4 is a wax-based release layer.

In some embodiments, release layer 4 has a thickness of at most 1 μm, at most 0.5 μm, at most 0.2 μm, at most 0.1 μm, or at most 0.04 μm.

In some embodiments, release layer 4 has a thickness within a range of 0.005 to 1 μm, 0.005 to 0.2 μm, 0.005 to 0.1 μm, 0.005 to 0.04 μm, or 0.005 to 0.02 μm.

In some embodiments, the patterned metal film on the surface of the arrangement or article includes a polymeric layer 6 on top of the metallic layer, distal to the substrate of the arrangement.

In some embodiments, polymeric layer 6 is, or includes, a lacquer layer.

In some embodiments, polymeric or lacquer layer 6 has a thickness of at most 5 μm, at most 3 μm, at most 2 μm, at most 1 μm, or at most 0.5 μm.

In some embodiments, polymeric or lacquer layer 6 has a thickness within a range of 0.2 to 5 μm, 0.5 to 5 μm, 0.5 to 4 μm, 0.5 to 3.5 μm, 1 to 3.5 μm, 0.2 to 3 μm, 0.2 to 2 μm, or 0.2 to 1.5 μm.

In some embodiments, the arrangement or article is devoid of polymeric layer 6.

In some embodiments, metallic layer 8 forms the external layer of the arrangement, distal to the substrate of the arrangement.

In some embodiments, metallic layer 8 has a thickness of at most 7 μm, at most 5 μm, at most 3 μm, at most 1 μm, at most 0.5 μm, at most 0.3 μm, at most 0.2 μm, at most 0.1 μm, or at most 0.05 μm.

In some embodiments, metallic layer 8 has a thickness within a range of 0.005 to 7 μm, 0.005 to 2 μm, 0.005 to 1 μm, 0.005 to 0.5 μm, 0.005 to 0.3 μm, 0.005 to 0.1 μm, 0.005 to 0.06 μm, 0.005 to 0.03 μm, 0.01 to 5 μm, 0.01 to 3 μm, 0.01 to 1.5 μm, 0.01 to 1 μm, 0.01 to 0.5 μm, 0.01 to 0.2 μm, 0.01 to 0.12 μm, or 0.01 to 0.06 μm.

In some embodiments, polymeric or adhesive layer 10 includes or consists essentially of a heat-activated adhesive.

In some embodiments, polymeric or adhesive layer 10 has a thickness within a range of 0.005 to 5 μm, 0.005 to 3.5 μm, 0.005 to 2.5 μm, 0.005 to 1.5 μm, 0.005 to 1 μm, 0.005 to 0.5 μm, 0.005 to 0.2 μm, 0.005 to 0.1 μm, or 0.005 to 0.04 μm.

In some embodiments, the total thickness of metal foil 1 is within a range of 7 to 60 μm, 7 to 50 μm, 7 to 40 μm, 10 to 60 μm, 10 to 50 μm, 10 to 40 μm, 10 to 30 μm, 12 to 40 μm, 12 to 30 μm, or 12 to 25 μm.

In some embodiments, the total thickness of multi-layered transfer film or portion 12 is within a range of 0.5 to 40 μm, 0.7 to 40 μm, 1.0 to 40 μm, 1.2 to 40 μm, 1.5 to 40 μm, 2 to 40 μm, 2 to 30 μm, 2.5 to 30 μm, 3 to 30 μm, or 3.5 to 25 μm.

In some embodiments, the total thickness of multi-layered transfer film or portion 12 is at most 30 μm, at most 25 μm, at most 20 μm, at most 18 μm, at most 15 μm, at most 12 μm, at most 10 μm, at most 8 μm, at most 6 μm, or at most 4 μm.

In embodiments of the present invention, the ink formulation utilized may include UV-curable materials.

In embodiments of the present invention, the ink formulation utilized may include UV-curable acrylic monomers. Specific examples of acrylic monomers (also called reactive diluents) may include monofunctional acrylate esters such as lauryl acrylate, isodecyl acrylate, tridecyl acrylate, isobornyl acrylate, 2-(2-ethoxyethoxy) ethyl acrylate, and 4-tert-butylcyclohexyl acrylate.

In embodiments of the present invention, the ink formulation utilized contains 20 to 90 weight % monofunctional acrylates.

In embodiments of the present invention, the ink formulation utilized contains 20 to 80 weight %, 20 to 70 weight %, 20 to 60 weight %, 30 to 90 weight %, 30 to 80 weight %, 30 to 70 weight %, or 30 to 60 weight % monofunctional acrylates.

Examples of acrylic monomers may also include difunctional or multifunctional acrylates such as 1,6-hexanediol diacrylate, dipropylene glycol diacrylate, and trimethylolpropane triacrylate.

In embodiments of the present invention, the ink formulation utilized contains 0 to 20 weight percent multifunctional acrylates.

In embodiments of the present invention, the ink formulation utilized contains 1 to 20 weight %, 2 to 20 weight %, 3 to 20 weight %, 5 to 20 weight %, 1 to 15 weight %, 2 to 15 weight %, 3 to 15 weight %, 5 to 15 weight %, 1 to 12 weight %, 2 to 12 weight %, 3 to 12 weight %, or 5 to 12 weight %, of the multifunctional acrylates.

In embodiments of the present invention, the total concentration of monofunctional acrylates and multifunctional acrylates within the ink formulation utilized is within a range of 20 to 95 weight %.

In embodiments of the present invention, the total concentration of monofunctional acrylates and multifunctional acrylates within the ink formulation utilized is within a range of 20 to 90 weight %, 20 to 85 weight %, 20 to 80 weight %, 20 to 75 weight %, 20 to 70 weight %, 30 to 95 weight %, 30 to 90 weight %, 30 to 85 weight %, 30 to 80 weight %, 30 to 75 weight %, or 30 to 70 weight %.

In embodiments of the present invention, the ink formulation utilized may include UV-curable oligomers such as epoxy acrylates, urethane acrylates, and polyester acrylates. The oligomers may be characterized by low Tg, preferably below 0° C.

Specific examples of such oligomers include, but are not limited to, urethane acrylates such as Genomer 4188/EHA (Rahn), Genomer 4215 (Rahn), Genomer 4217 (Rahn), polyester acrylates, such as CN966H90 (Sartomer), nonacrylic polyester resins such as Genomer 6043/M22 (Rahn).

In embodiments of the present invention, the ink formulation utilized contains 5 to 20% UV-curable oligomers.

In embodiments of the present invention, the ink formulation utilized contains 5 to 15%, 5 to 12%, 5 to 10%, 7 to 20%, 7 to 15%, or 7 to 12% UV-curable oligomers.

In embodiments of the present invention, the ink formulation utilized may include photo-initiators characterized by the ability to create reactive species when exposed to radiation.

In embodiments of the present invention, the ink formulation utilized contains 0.1 to 10 weight percent of one or more photo-initiators.

In embodiments of the present invention, the ink formulation utilized contains 0.2 to 10 weight %, 0.2 to 7 weight %, 0.2 to 5 weight %, 0.4 to 10 weight %, 0.4 to 5 weight %, 0.4 to 3.5 weight %, 0.6 to 10 weight %, 0.6 to 7 weight %, 0.6 to 3.5 weight %, 0.8 to 7 weight %, 0.8 to 5 weight %, 0.8 to 3.5 weight %, 1 to 10 weight %, 1 to 5 weight %, 1 to 3.5 weight %, 2 to 10 weight %, 2 to 7 weight %, or 2 to 5 weight % of the one or more photo-initiators.

In embodiments of the present invention, the photo-initiators within the ink formulation may include alpha-hydroxy ketones, alpha-amino ketones, and phosphine oxides.

In some cases, the first mixture also can include surfactants which lower the surface tension of the ink layer.

In embodiments of the present invention, the at least partially cured patterned layer of polymer 22 has a thickness within the range of 2 to 200 μm. This thickness is measured in the direction N normal to the substrate.

In embodiments of the present invention, the thickness of the at least partially cured patterned layer of polymer 22 is within the range of 5 to 300 μm, 5 to 200 μm, 5 to 250 μm, 10 to 300 μm, 10 to 200 μm, 15 to 300 μm, 15 to 250 μm, 15 to 200 μm, 20 to 300 μm, 20 to 250 μm, 20 to 200 μm, 25 to 250 μm, 30 to 200 μm, 35 to 200 μm, 50 to 200 μm, 25 to 150 μm, 25 to 120 μm, 25 to 100 μm, or 50 to 120 μm.

In embodiments of the present invention, the thickness of the at least partially cured patterned layer of polymer 22 is within the range of 25 to 250 μm.

In embodiments of the present invention, this thickness is within the range of 27 to 250 μm.

In embodiments of the present invention, this thickness is within the range of 30 to 250 μm.

In embodiments of the present invention, this thickness is within the range of 32 to 250 μm.

In embodiments of the present invention, this thickness is within the range of 35 to 250 μm.

The thickness ranges of the fully cured patterned layer may be the same as the thickness ranges of the at least partially cured patterned layer (e.g., 25 to 250 μm, etc.). In embodiments of the present invention, the thickness of the ink formulation applied to the metal foil is within the range of 5 to 300 μm, 5 to 150 μm, 10 to 150 μm, 15 to 150 μm, 20 to 150 μm, 25 to 150 μm, 35 to 250 μm, 35 to 150 μm, or 50 to 150 μm.

In embodiments of the present invention, the thickness of the ink formulation applied to the metal foil is within the range of 30 to 150 μm, 30 to 120 μm, 40 to 150 μm, 40 to 120 μm, 50 to 120 μm, 60 to 150 μm, or 60 to 120 μm.

EXAMPLES

Reference is now made to the following examples, which together with the above descriptions, illustrate the invention in a non-limiting fashion.

Example 1

Ink Preparation Procedure

The ink formulations utilized in accordance with the present invention were prepared in a batch process. A typical batch produced about 10 kg of ink formulation. In the preparation procedure, the various ink components are introduced into a mixing vessel and stirred for about 4 hours. The resulting, substantially homogeneous liquid was filtered through a 1 micrometer filter to produce the ink formulation.

Example 2

Ink Formulation 2 had the following composition:

| Component | Content (%) | Function | Chemical family |
|---|---|---|---|
| Isobornyl Acrylate | 22 | Reactive diluent | Acrylate |
| Tridecyl Acrylate | 30 | Reactive diluent | Acrylate |
| Genomer 4188/EHA | 22 | Tackifier | Urethane acylate oligomer |
| BASF Vmox | 18 | Reactive diluent | Vinyl monomer |
| Esacure KIP 160 | 2 | Photoinitiator | Alpha hydroxy ketone |
| Omnirad TPO | 5 | Photoinitiator | Phosphine oxide (2,4,6-trimethylbenzoyl-diphenyl-phosphine oxide) |
| Irgastab UV 22 | 0.3 | Stabilizer | |
| BYK 3500 | 0.1 | Surfactant | Silicone-containing surface additive |
| Genorad 16 | 0.6 | Stabilizer | |

Ink Formulation 2 was prepared according to the procedure of Example 1.

Example 3

Ink Formulation 3 had the following composition:

| Component | Content (%) | Function | Chemical family |
|---|---|---|---|
| Isobornyl Acrylate | 35 | Reactive diluent | Acrylate |
| Lauryl Acrylate | 37 | Reactive diluent | Acrylate |
| Genomer 4269/M22 | 22 | Tackifier | Urethane acylate oligomer |
| Irgacure 127 | 2 | Photoinitiator | Alpha hydroxy ketone |
| Omnirad TPO | 3 | Photoinitiator | Phosphine oxide |
| Irgastab UV 22 | 0.3 | Stabilizer | |
| TegoRad 2250 | 0.1 | Surfactant | Silicone-containing surface additive |
| Genorad 16 | 0.6 | Stabilizer | |

Ink Formulation 3 was prepared according to the procedure of Example 1.

Example 4

Ink Formulation 4 had the following composition:

| Component | Content (%) | Function | Chemical family |
|---|---|---|---|
| 4-tert-Butylcyclohexyl acrylate | 40 | Reactive diluent | Acrylate |
| Tridecyl Acrylate | 34 | Reactive diluent | Acrylate |
| Sartomer CN966H90 | 20 | Tackifier | Urethane acylate oligomer |
| Irgacure 127 | 2 | Photoinitiator | Alpha hydroxy ketone |
| Omnirad TPO | 3 | Photoinitiator | Phosphine oxide |
| Irgastab UV 22 | 0.3 | Stabilizer | |
| TegoRad 2250 | 0.1 | Surfactant | Silicone-containing surface additive |
| Genorad 16 | 0.6 | Stabilizer | |

Ink Formulation 4 was prepared according to the procedure of Example 1.

Example 5

Ink Formulation 5 had the following composition:

| Component | Content (%) | Function | Chemical family |
|---|---|---|---|
| 4-tert-Butylcyclohexyl acrylate | 25 | Reactive diluent | Acrylate |
| 2-(2-Ethoxyethoxy) ethyl acrylate (EOEOEA) | 29 | Reactive diluent | Acrylate |
| Genomer 4188/M22 | 22 | Tackifier | Urethane acylate oligomer |
| Decyl acrylate | 18 | Reactive diluent | Acrylate |
| Esacure KIP 160 | 2 | Photoinitiator | Alpha hydroxy ketone |
| Irgacure 819 | 3 | Photoinitiator | Phosphine oxide |
| Irgastab UV 22 | 0.3 | Stabilizer | |
| BYK 3500 | 0.1 | Surfactant | Silicone-containing surface additive |
| Genorad 16 | 0.6 | Stabilizer | |

Ink Formulation 5 was prepared according to the procedure of Example 1.

Comparative Example 6

Ink Formulation 6 had the following composition:

| Component | Content (%) | Function | Chemical family |
|---|---|---|---|
| 1,6-Hexanediol diacrylate | 35 | Reactive diluent | Acrylate |
| 2-(2-Ethoxyethoxy) ethyl acrylate (EOEOEA) | 30 | Reactive diluent | Acrylate |
| Genomer 4188/M22 | 8 | Tackifier | Urethane acylate oligomer |
| Ebecryl 83 | 20 | Oligomer | Polyester Acrylate oligomer |
| Irgacure 127 | 2 | Photoinitiator | Alpha hydroxy ketone |
| Omnirad TPO | 4 | Photoinitiator | Phosphine oxide |
| Irgastab UV 22 | 0.3 | Stabilizer | |
| BYK 3500 | 0.1 | Surfactant | Silicone-containing surface additive |
| Genorad 16 | 0.6 | Stabilizer | |

Ink Formulation 6 was prepared according to the procedure of Example 1.

Example 7

Ink Formulation 2 was utilized to produce a metallic image on a fabric containing natural cotton fibers. Ink Formulation 2 was printed directly onto a metal foil. After curing, the tacky, at-least partially cured formulation was transferred onto a fabric.

In greater depth now, the metallic image was produced by applying Ink Formulation 2 onto a back (adhesive) side of a foil (Kurz, Cold foil, Scodix 351, Gold), using an ink jet press (Scodix Ultra) equipped with Ricoh Gen4 printheads. The thickness of the applied wet layer was approximately 100 μm, which corresponds to a dry layer of essentially the same thickness (95 μm to 100 μm). The printed layer was cured by irradiation using a LED array (395 nm, 5 W/cm$^2$) followed by irradiation using UV lamps (2×240 W/cm, mercury, medium pressure) at 16 m/min. During the partial curing, the viscosity of the printed layer increased, and the layer became tacky and fixed in place.

After curing, a sheet of foil (20 cm×20 cm) was deposited on top of a piece of natural cotton fabric (20 cm×20 cm). This arrangement was then placed in a press pre-heated to 175° C., and pressed at a pressure of 0.05 kg/cm$^2$ for 30 seconds. After the fabric with the foil was cooled to room temperature, the foil was gently peeled off (removed). As a result, the parts of the foil covered with Ink Formulation 2 were transferred—in their entirety—onto the surface of the fabric.

Example 7 demonstrates that the inventive method is feasible for producing metal images on (highly porous) textile materials by direct digital (ink-jet) printing of ink onto a metal foil.

Example 8

Ink Formulation 2 was utilized for printing on a metal foil. After curing, the tacky, at-least partially cured formulation was transferred onto a highly porous, uncoated paper substrate.

The image was produced by applying Formulation 2 onto a back (adhesive) side of a foil (Kurz, Cold foil, Scodix basic, Blue), using an ink jet press (Scodix Ultra) equipped with Ricoh Gen4 printheads. The thickness of the applied layer was approximately 40 μm. The printed layer was cured by irradiation using a LED array (395 nm, 5 W/cm$^2$) followed by irradiation using UV lamps (2×240 W/cm, mercury, medium pressure) at 16 m/min. During the partial curing, the viscosity of the printed layer increased, and the layer became tacky and fixed in place.

After this curing, a sheet of foil (20 cm×20 cm) was deposited on top of a 20 cm×20 cm piece of uncoated, highly porous paper substrate (digital Bianco Flash Premium, Favini). This arrangement was then placed in a press pre-heated to 175° C., and pressed at a pressure of 0.05 kg/cm$^2$ for 30 seconds. After the paper and foil arrangement was cooled to room temperature, the foil was gently peeled off (removed). As a result, the parts of the foil covered with Ink Formulation 2 were transferred—in their entirety—onto the surface of the uncoated, highly porous paper substrate.

Example 8 demonstrates the feasibility of the disclosed method to create metal images on highly porous paper substrates by direct digital (ink-jet) printing of ink onto a metal foil.

Comparative Example 9

Ink Formulation 2 was applied directly onto the highly porous substrate of Example 8 under identical conditions. After the curing step, substantially no adhesive layer was created on top of the paper substrate, presumably due to the absorption of the liquid ink within the pores and/or fibers of the paper. When the printed substrate was contacted with the foil, substantially no transfer occurred.

Comparative Example 9 demonstrates some of the appreciable difficulties in producing a foil image by direct application of a UV curable ink jet ink on highly absorbent substrates.

Example 10

Ink Formulation 2 was utilized to produce a metallic image on a fabric containing synthetic (polyester) fibers. The metallic image was produced by applying Ink Formulation 2 onto a back (adhesive) side of a foil (Kurz, Cold foil, Scodix 351, Gold), using an ink jet press (Scodix Ultra) equipped with Ricoh Gen4 printheads. The thickness of the applied wet layer was approximately 100 μm, which corresponds to a dry layer of essentially the same thickness (95 μm to 100 μm). The printed layer was cured by irradiation using a LED array (395 nm, 5 W/cm$^2$) followed by irradiation using UV lamps (2×240 W/cm, mercury, medium pressure) at 16 m/min. During the partial curing, the viscosity of the printed layer increased, and the layer became tacky and fixed in place.

After curing, a sheet of foil (20 cm×20 cm) was deposited on top of a piece of synthetic (polyester) fabric (20 cm×20 cm). This arrangement was then placed in a press pre-heated to 175° C., and pressed at a pressure of 0.05 kg/cm$^2$ for 30 seconds. After the fabric with the foil was cooled to room temperature, the foil was gently peeled off (removed). As a result, the parts of the foil covered with Ink Formulation 2 were transferred—in their entirety—onto the surface of the fabric.

Example 11

Ink Formulation 3 was utilized for printing on a metal foil. After curing, the tacky, at-least partially cured formulation was transferred onto a highly porous, uncoated paper substrate.

The image was produced by applying Ink Formulation 3 onto a back (adhesive) side of a foil (Kurz, Cold foil, Scodix basic, Blue), using an ink jet press (Scodix Ultra) equipped with Ricoh Gen4 printheads. The thickness of the applied layer was approximately 40 μm. The printed layer was cured by irradiation using a LED array (395 nm, 5 W/cm$^2$) followed by irradiation using UV lamps (2×240 W/cm, mercury, medium pressure) at 16 m/min. During the partial curing, the viscosity of the printed layer increased, and the layer became tacky and fixed in place.

After this curing, a sheet of foil (20 cm×20 cm) was deposited on top of a 20 cm×20 cm piece of uncoated, highly porous paper substrate (100 lb. Finch fine id cover. This arrangement was then placed in a press pre-heated to 175° C., and pressed at a pressure of 0.05 kg/cm$^2$ for 40 seconds. After the paper and foil arrangement was cooled to room temperature, the foil was gently peeled off (removed). As a result, the parts of the foil covered with Ink Formulation 3 were transferred—in their entirety—onto the surface of the uncoated, highly porous paper substrate.

Example 12

Ink Formulation 4 was utilized for printing on a metal foil. After curing, the tacky, at-least partially cured formulation was transferred onto a highly porous, uncoated paper substrate.

The image was created by applying Formulation 4 onto a back (adhesive) side of a foil (Kurz, Cold foil, Scodix basic, Blue), using an ink jet press (Scodix Ultra) equipped with Ricoh Gen4 printheads. The thickness of the applied layer was approximately 40 μm. The printed layer was cured by irradiation using a LED array (395 nm, 5 W/cm$^2$) followed by irradiation using UV lamps (2×240 W/cm, mercury, medium pressure) at 16 m/min. During the partial curing, the viscosity of the printed layer increased, and the layer became tacky and fixed in place.

After this curing, a sheet of foil (20 cm×20 cm) was deposited on top of a 20 cm×20 cm piece of uncoated, highly porous paper substrate (DNS premium-paper union2, Mondi). This arrangement was then placed in a press pre-heated to 175° C., and pressed at a pressure of 0.05 kg/cm$^2$ for 40 seconds. After the paper and foil arrangement was cooled to room temperature, the foil was gently peeled off. As a result, the parts of the foil covered with Ink Formulation 4 were transferred—in their entirety—onto the surface of the uncoated, highly porous paper substrate.

Example 13

For comparative purposes, the procedure described in Example 7 was repeated using Comparative Ink Formulation 6. Significantly, substantially no transfer of foil parts covered with Ink Formulation 6 was observed.

Substrate Porosity—Discussion

The porosity is an indication of the openness of the substrate (e.g., a sheet of paper), as measured by resistance to the passage of air or other fluid through the substrate.

Two types of instruments are generally used to measure porosity—Gurley and Sheffield. The Gurley instrument measures the time (in seconds) required for a given volume of air to pass through a single sheet and is generally used for porous papers. A high reading indicates a less porous (or more dense) paper. Sheffield porosity measures the flow rate of air through a single sheet and is generally used for non-porous or dense sheets. A high Sheffield reading indicates a more open paper. A typical Gurley porosity test for a sheet of 50 lb. smooth offset paper may be 10-20 seconds. A Sheffield reading for a sheet of 60 lb. coated paper may be on the order of 10-20 units of air flow.

As used herein, the terms “porous”, “porosity”, and the like, with respect to a substrate, are meant to be understood as they are understood in the art of porous fibrous substrates (e.g., paper, fabrics). When applicable, ISO standard 5636-5:2013(E) may be used for the porosity measurement (Gurley method).

For the porous substrates as utilized herein, the characteristic Gurley time is typically at most 10 seconds. In some cases, the characteristic Gurley time is at most 7 seconds or at most 5 seconds.

As used herein in the specification and in the claims section that follows, the term "uncoated substrate" and the like is specifically meant to include newsprint papers including standard newsprint, telephone directory paper, machine-finished paper, and super-calendered paper; woodfree uncoated papers; paperboards and cartonboards; and containerboards.

The "thickness" of a wet layer may be determined as follows: when a volume of material vol covers a surface area of a surface having an area SA with a wet layer—the thickness of the wet layer is assumed to be vol/SA.

The "thickness" of a dried film is defined as follows: when a volume of material vol that is x % liquid, by weight, wets or covers a surface area SA of a surface, and all the liquid is evaporated away to convert the wet layer into a dry film, the thickness of the dry film is calculated as:

$$vol/\rho_{wet\ layer}(100-x)/(SA\cdot\rho_{dry\ layer})$$

where $\rho_{wet\ layer}$ is the specific gravity of the wet layer and $\rho_{dry\ layer}$ is the specific gravity of the dry layer.

The "thickness" of a metal foil, or of a layer thereof, is generally fairly even and may be determined at any point on the foil or layer.

The "thickness" of a patterned polymeric layer may be determined by various conventional techniques known in the art. One such technique is to remove at least a representative portion of the polymeric layer from the substrate, separating the polymeric material in this portion from any other materials (e.g., in adjacent layers), and calculating the volume of the portion, as well as the surface area of the substrate that was covered by the portion. The volume obtained, divided by this surface area, yields the thickness. In the methods of the present invention, the "viscosity" of a material in a particular method step, is measured at the operating temperature of that step.

Specifically with regard to the liquid pre-polymer, however, the viscosity (e.g., 100 cP) is measured at room temperature, unless otherwise specified.

The term "patterned layer" is best understood within the context of the instant Specification. In addition, the term "patterned layer" may be understood as it is generally used in the art.

As used herein in the specification and in the claims section that follows, the term "percent", or "%", refers to percent by weight, unless specifically indicated otherwise.

In the context of the present application and claims, the phrase "at least one of A and B" is equivalent to an inclusive "or", and includes any one of "only A", "only B", or "A and B". Similarly, the phrase "at least one of A, B, and C" is equivalent to an inclusive "or", and includes any one of "only A", "only B", "only C", "A and B", "A and C", "B and C", or "A and B and C".

As used herein in the specification and in the claims section that follows, the terms "top", "bottom", "upper", "lower", "height" and "side" and the like are utilized for convenience of description or for relative orientation, and are not necessarily intended to indicate an absolute orientation in space.

Additional Embodiments

Additional Embodiments (or "clauses") 1 to 34 are provided hereinbelow.

Embodiment 1. An article having a patterned metallic film on a surface thereof, the article comprising: (a) a porous substrate having a first porous surface; (b) a patterned metallic film attached to said first porous surface, said patterned metallic film including (i) a first patterned polymeric layer attached to said first porous surface; and (ii) a patterned metallic layer attached to said first patterned polymeric layer, on a distal side with respect to said first porous surface; wherein a thickness of said metal layer is at most 40 μm.

Embodiment 2. The article of Embodiment 1, wherein said first patterned polymeric layer has a thickness within the range of 15 to 250 micrometers (μm).

Embodiment 3. The article of Embodiment 2, wherein said thickness is at least 25 μm.

Embodiment 4. The article of Embodiment 2, wherein said thickness is at least 30 μm.

Embodiment 5. The article of Embodiment 2, wherein said thickness is at least 35 μm.

Embodiment 6. The article of Embodiment 2, wherein said thickness is at least 40 μm.

Embodiment 7. The article of Embodiment 2, wherein said thickness is at least 45 μm.

Embodiment 8. The article of Embodiment 2, wherein said thickness is at most 200 μm.

Embodiment 9. The article of any one of the preceding Embodiments, wherein said first patterned polymeric layer includes a photo-initiator.

Embodiment 9A. The article of Embodiment 9, wherein the concentration of said photo-initiator within said first patterned polymeric layer is within a range of 0.1 to 10%.

Embodiment 9B. The article of Embodiment 9A, wherein the concentration of said photo-initiator is at least 0.4%.

Embodiment 9C. The article of Embodiment 9A, wherein the concentration of said photo-initiator is at least 1%.

Embodiment 9D. The article of any one of Embodiments 9A-9C, wherein the concentration of said photo-initiator is at most 5%.

Embodiment 10. The article of any one of the preceding Embodiments, wherein said first patterned polymeric layer includes a photodecomposition product of a or the photo-initiator.

Embodiment 11. The article of any one of the preceding Embodiments, wherein a polymer of said first patterned polymeric layer extends within said first porous surface by an extent of at most 5 μm.

Embodiment 12. The article of Embodiment 11, wherein the extent is at most 4 μm.

Embodiment 13. The article of Embodiment 11, wherein the extent is at most 3 μm.

Embodiment 14. The article of any one of Embodiments 11-13, wherein the extent is at least 0.3 μm.

Embodiment 15. The article of Embodiment 14, wherein the extent is at least 0.5 μm.

Embodiment 16. The article of Embodiment 14, wherein the extent is at least 1 μm.

Embodiment 17. The article of Embodiment 14, wherein the extent is at least 1.5 μm. wherein the thickness of said first patterned polymeric layer is within the range of 25 to Embodiment 18. The article of any one of the preceding Embodiments, wherein the metal of said patterned metallic layer is or includes a metal selected from the group consisting of aluminum, copper, silver, and chromium, and combinations thereof.

Embodiment 19. The article of Embodiment 18, wherein the metal of said patterned metallic layer is aluminum.

Embodiment 20. The article of Embodiment 18, wherein the metal of said patterned metallic layer is copper.

Embodiment 21. The article of any one of the preceding Embodiments, wherein said porous substrate is a fabric, textile or uncoated paper, wherein said thickness is at least 35 μm, and wherein a polymer of said first patterned polymeric layer extends within said first porous surface by an extent within a range of 0.3 to 3 μm.

Embodiment 22. The article of any one of the preceding Embodiments, wherein the thickness of said first patterned polymeric layer is within the range of 5 to 300 micrometers, 5 to 200 μm, 5 to 250 μm, 10 to 300 μm, or 10 to 200 μm.

Embodiment 22A. The article of any one of the preceding Embodiments, wherein the thickness of the metal layer is at most 20 μm.

Embodiment 22B. The article of Embodiment 22A, wherein the thickness of the metal layer is at most 7 μm.

Embodiment 22C. The article of Embodiment 22A, wherein the thickness of the metal layer is at most 3 μm.

Embodiment 22D. The article of Embodiment 22A, wherein the thickness of the metal layer is at most 2 μm.

Embodiment 22E. The article of any one of the preceding Embodiments, wherein the thickness of the metal layer is at least 0.1 μm.

Embodiment 22F. The article of Embodiment 22E, wherein the thickness of the metal layer is at least 0.3 μm.

Embodiment 22G. The article of Embodiment 22E, wherein the thickness of the metal layer is at least 0.5 μm.

Embodiment 22H. The article of Embodiment 22E, wherein the thickness of the metal layer is at least 0.8 μm.

Embodiment 23. A method of producing a printed article, the method comprising:

(a) selectively depositing a liquid pre-polymer on a first surface of a multi-layered transfer portion of a metal foil, according to a digital pattern, to produce a first pattern, said liquid pre-polymer having a viscosity of at most 100 cP; said metal foil including: (i) a substrate portion having a release layer disposed on top of a carrier layer; and (ii) said multi-layered transfer portion, wherein said multi-layered transfer portion includes a first polymeric layer distally disposed with respect to said substrate portion, a metallic layer disposed between said first polymeric layer and said substrate portion, proximal to said release layer, and optionally, a second polymeric layer, disposed in between said release layer and said metallic layer;

said metal foil having a thickness of at most 40 micrometers;

(b) fixing said first pattern on said first surface by treating said liquid pre-polymer on said first surface to produce an at least partially cured patterned layer of polymer;

(c) after said at least partially cured patterned layer of polymer is rendered tacky, pressure-contacting said at least partially cured patterned layer of polymer with the contacting surface of the porous substrate, to adhere said at least partially cured patterned layer of polymer to said contacting surface; and (d) separating said contacting surface and said substrate portion of said metal foil to selectively transfer a portion of said transfer portion of said metal foil to said contacting surface, to produce the selective metallic pattern on the porous substrate.

Embodiment 24. The method of Embodiment 23, wherein said at least partially cured patterned layer of polymer has a viscosity of at least 10,000 cP.

Embodiment 25. The method of Embodiment 23, wherein said at least partially cured patterned layer of polymer has a viscosity of at least 25,000 cP.

Embodiment 26. The method of either of Embodiments 24-25, wherein said viscosity of said at least partially cured patterned layer of polymer is at most 500,000 cP.

Embodiment 27. The method of Embodiment 26, wherein said viscosity of said at least partially cured patterned layer of polymer is at most 150,000 cP.

Embodiment 28. The method of any one of the Embodiments 23-27, wherein said selectively depositing of said liquid pre-polymer is performed by ink-jetting.

Embodiment 29. The method of any one of the Embodiments 23-28, wherein said treating of said liquid pre-polymer on said first surface also renders tacky said at least partially cured patterned layer of polymer.

Embodiment 30. The method of any one of Embodiments 23-29, wherein said treating of said liquid pre-polymer includes curing.

Embodiment 31. The method of any one of Embodiments 23-30, wherein said treating of said liquid pre-polymer includes UV curing.

Embodiment 32. The method of any one of Embodiments 23-31, wherein said treating of said liquid pre-polymer includes electron beam curing.

Embodiment 33. The method of any one of Embodiments 23-32, wherein said polymeric layer is an adhesive polymeric layer.

Embodiment 34. The method of any one of Embodiments 23-33, the method performed so as to produce the article of any one of Embodiments 1-22H.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An article having a patterned metallic film on a surface thereof, the article comprising:

(a) a porous substrate having a first porous surface; and (b) a patterned metallic film attached to said first porous surface, said patterned metallic film including (i) a first patterned polymeric layer attached to said first porous surface; and (ii) a patterned metallic layer attached to said first patterned polymeric layer, on a distal side with respect to said first porous surface, wherein a thickness of said metal layer is at most 3 μm, wherein said first patterned polymeric layer has a thickness within the range of 30 to 250 micrometers (μm), and wherein a polymer of said first patterned polymeric layer extends within said first porous surface by an extent of at most 5 μm.

2. The article of claim 1, wherein said thickness of said first patterned polymeric layer is at least 35 μm.

3. The article of claim 1, wherein said first patterned polymeric layer includes at least one of (i) a photo-initiator and (b) a photodecomposition product of said photo-initiator.

4. The article of claim 1, wherein said extent is within a range of 0.3 to 3 μm.

5. The article of claim 1, further comprising a second polymeric layer attached to said metal foil on an opposite side thereof.

6. The article of claim 1, wherein said porous substrate is a fabric or textile.

7. The article of claim 1, wherein said porous substrate is an uncoated paper.

8. The article of claim 1, wherein said first patterned polymeric layer is, or includes, a UV-cured polymeric layer.

9. The article of claim 1, wherein the metal of said patterned metallic layer is or includes at least one metal selected from the group consisting of aluminum, copper, silver, and chromium.

10. The article of claim 1, wherein the metal of said patterned metallic layer is aluminum.

11. The article of claim 1, wherein the metal of said patterned metallic layer is copper.

12. The article of claim 1, wherein said porous substrate is a fabric or textile, wherein said thickness of said first patterned polymeric layer is at least 35 μm, and wherein a polymer of said first patterned polymeric layer extends within said first porous surface by an extent within a range of 0.3 to 3 μm.

13. The article of claim 12, wherein said first patterned polymeric layer includes a UV-cured polymeric layer.

14. A method of producing an article having a patterned metallic film on a surface thereof, the method comprising:

(a) selectively depositing a liquid pre-polymer on a first surface of a multi-layered transfer portion of a metal foil, according to a digital pattern, to produce a first pattern, said liquid pre-polymer having a viscosity of at most 100 cP, said metal foil including:

(i) a substrate portion having a release layer disposed on top of a carrier layer, and (ii) said multi-layered transfer portion, wherein said multi-layered transfer portion includes a first polymeric layer distally disposed with respect to said substrate portion, a metallic layer disposed between said first polymeric layer and said substrate portion, proximal to said release layer, and optionally, a second polymeric layer, disposed in between said release layer and said metallic layer, said metal foil having a thickness of at most 40 micrometers;

(b) fixing said first pattern on said first surface by treating said liquid pre-polymer on said first surface to produce an at least partially cured patterned layer of polymer, said polymer having a viscosity of at least 10,000 cP;

(c) after said at least partially cured patterned layer of polymer is rendered tacky, pressure-contacting said at least partially cured patterned layer of polymer with a contacting surface of a porous substrate, to adhere said at least partially cured patterned layer of polymer to said contacting surface; and (d) separating said contacting surface and said substrate portion of said metal foil to selectively transfer a portion of said transfer portion of said metal foil to said contacting surface, to produce the selective metallic pattern on the porous substrate.

15. The method of claim 14, wherein said treating of said liquid pre-polymer includes curing.

16. The method of claim 14, wherein said first polymeric layer is an adhesive polymeric layer.

17. The method of claim 16, wherein the adhesive polymeric layer is selectively applied directly to the target substrate.

18. The method of claim 14, wherein said treating of said liquid pre-polymer on said first surface also renders tacky said at least partially cured patterned layer of polymer.

* * * * *